United States Patent
Sarett et al.

(10) Patent No.: US 9,930,354 B2
(45) Date of Patent: Mar. 27, 2018

(54) SKIP SCANLINES ON JPEG IMAGE DECODES

(71) Applicant: GOOGLE INC., Mountain View, CA (US)

(72) Inventors: Matt Sarett, Chapel Hill, NC (US); Leon Scroggins, Chapel Hill, NC (US); Derek Sollenberger, Cary, NC (US); Michael Roland Reed, Chapel Hill, NC (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 14/966,858

(22) Filed: Dec. 11, 2015

(65) Prior Publication Data

US 2017/0171554 A1    Jun. 15, 2017

(51) Int. Cl.
| | | |
|---|---|---|
| G06K 9/36 | (2006.01) | |
| H04N 19/44 | (2014.01) | |
| H04N 19/91 | (2014.01) | |
| H04N 19/176 | (2014.01) | |
| H04N 19/182 | (2014.01) | |
| H04N 19/625 | (2014.01) | |
| H04N 19/18 | (2014.01) | |

(52) U.S. Cl.
CPC .......... H04N 19/44 (2014.11); H04N 19/176 (2014.11); H04N 19/18 (2014.11); H04N 19/182 (2014.11); H04N 19/625 (2014.11); H04N 19/91 (2014.11)

(58) Field of Classification Search
CPC .... H04N 19/60; H04N 19/162; H04N 19/167; H04N 19/169; H04N 19/176; H04N 19/46
See application file for complete search history.

(56) References Cited

U.S. PATENT DOCUMENTS

| 6,381,371 B1 | 4/2002 | Epstein et al. |
| 6,741,746 B2 | 5/2004 | Nhu et al. |

(Continued)

FOREIGN PATENT DOCUMENTS

| WO | 2005050567 A1 | 6/2005 |
| WO | 2008122913 A2 | 10/2008 |

OTHER PUBLICATIONS

"Libjpeg-turbo", SIMD-accelerated libjpeg-compatible JPEG codec library, retrieved on Dec. 9, 2015 from http://sourceforge.net/p/libjpeg-turbo/patches/24/, 10 pages.

(Continued)

*Primary Examiner* — Li Liu
(74) *Attorney, Agent, or Firm* — Brake Hughes Bellermann LLP

(57) ABSTRACT

An image decoder includes a processor and a memory. The memory includes instructions configured to cause the processor to perform steps. The steps include to receive a bitstream including a plurality encoded blocks representing an image, receive a boundary indicator representing a cropped portion of the image, determine a row start and a row end within the image based on the boundary indicator, and in a single decoding pass, entropy decode the plurality of encoded blocks that include the row start, the row end and the rows there between and transform for display a portion of the plurality of encoded blocks that include the rows including the cropped portion of the image, and skip processing of a remainder of the plurality of encoded blocks.

20 Claims, 9 Drawing Sheets

(56) References Cited

U.S. PATENT DOCUMENTS

| | | | |
|---|---|---|---|
| 7,391,913 B2 | 6/2008 | Huang et al. | |
| 7,421,130 B2 | 9/2008 | Jeffrey et al. | |
| 7,469,068 B2 | 12/2008 | Jeffrey et al. | |
| 7,548,654 B2 | 6/2009 | Neelamani et al. | |
| 8,503,802 B1 | 8/2013 | Ding | |
| 8,902,992 B2 | 12/2014 | Goetting | |
| 2004/0001636 A1* | 1/2004 | Miceli | G06T 9/00 382/235 |
| 2005/0063597 A1* | 3/2005 | Mao | H04N 19/70 382/232 |
| 2006/0147122 A1* | 7/2006 | Srinidhi | H04N 19/46 382/235 |
| 2010/0040299 A1* | 2/2010 | Noh | H04N 19/172 382/233 |
| 2010/0118947 A1* | 5/2010 | Goetting | H04N 19/60 375/240.12 |
| 2011/0013850 A1 | 1/2011 | Wang et al. | |
| 2011/0216981 A1* | 9/2011 | Hiraga | H04N 19/176 382/233 |
| 2015/0312542 A1* | 10/2015 | Suginohara | G09G 3/2003 345/603 |

OTHER PUBLICATIONS

International Search Report and Written Opinion for PCT Application No. PCT/US2016/65821, dated Mar. 2, 2017, 10 pages.
Queiroz, "Processing JPEG-Compressed Images and Documents", IEEE Service Center, vol. 7, No. 12, Dec. 1, 1988, pp. 1661-1672.

* cited by examiner

SKIP SCANLINES ON JPEG IMAGE DECODES

FIELD

Embodiments relate to decoding image bitstreams.

BACKGROUND

Techniques used for decoding image bitstreams where the resultant image is to be cropped for display can include entropy decoding an entire encoded image in a first pass operation. Then in a second pass operation, steps to dequantize, inverse discrete cosine transform (DCT), upsample and color convert pixels to generate an image are performed. Finally, in a third operation, the decoded image is cropped. Some techniques can perform the cropping operation during the second pass operation.

Dequantizing, inverse DCT transforming, upsampling and color converting pixels can be processor intensive operations.

SUMMARY

In a general aspect, an image decoder includes a processor and a memory. The memory includes instructions configured to cause the processor to perform steps. The steps include to receive a bitstream including a plurality encoded blocks representing an image, receive a boundary indicator representing a cropped portion of the image, determine a row start and a row end within the image based on the boundary indicator, and in a single decoding pass, entropy decode the plurality of encoded blocks that include the row start, the row end and the rows there between and transform for display a portion of the plurality of encoded blocks that include the rows including the cropped portion of the image, and skip processing of a remainder of the plurality of encoded blocks.

In another general aspect, a method includes receiving a bitstream including a plurality encoded blocks representing an image, receiving a boundary indicator representing a cropped portion of the image, determining a row start and a row end within the image based on the boundary indicator, and in a single decoding pass, entropy decoding the plurality of encoded blocks that include the row start, the row end and the rows there between and transform for display a portion of the plurality of encoded blocks that include the rows including the cropped portion of the image, and skipping processing of a remainder of the plurality of encoded blocks.

In still another general aspect, a non-transitory computer-readable storage medium having stored thereon computer executable program code which, when executed on a computer system, causes the computer system to perform steps. The steps include receiving a bitstream including a plurality encoded blocks representing an image, receiving a boundary indicator representing a cropped portion of the image, determining a row start and a row end within the image based on the boundary indicator and in a single decoding pass, selecting a row of pixels to be decoded, determining whether the row of pixels to be decoded is included in the row start, the row end or the rows there between, upon determining the row of pixels to be decoded is included in the row start, the row end or the rows there between, determining whether a row of blocks of the plurality encoded blocks including the row of pixels to be decoded has been entropy decoded, upon determining the row of blocks of the plurality encoded blocks including the row of pixels to be decoded has been entropy decoded, inverse transform the row of pixels to be decoded, and upon determining the row of blocks of the plurality encoded blocks including the row of pixels to be decoded has not been entropy decoded, entropy decode the row of blocks of the plurality encoded blocks including the row of pixels to be decoded and inverse transform the row of pixels to be decoded, and upon determining the row of pixels to be decoded is not included in the row start, the row end or the rows there between, skip processing of the row of pixels to be decoded.

Implementations can include one or more of the following features. For example, each of the plurality encoded blocks can be independently encoded and an entropy decoded one of the plurality encoded blocks indicates a start position of a next of the plurality encoded blocks. The encoded blocks representing the image may be encoded using a JPEG codec. The single decoding pass can begin at the row start and ends at the row end.

For example, during the single pass, the instructions can cause the processor to select a row of pixels to be decoded, determine whether the row of pixels to be decoded is included in the row start, the row end or the rows there between, upon determining the row of pixels to be decoded is included in the row start, the row end or the rows there between, determine whether a row of blocks of the plurality encoded blocks including the row of pixels to be decoded has been entropy decoded, upon determining the row of blocks of the plurality encoded blocks including the row of pixels to be decoded has been entropy decoded, inverse transform the row of pixels to be decoded, and upon determining the row of blocks of the plurality encoded blocks including the row of pixels to be decoded has not been entropy decoded, entropy decode the row of blocks of the plurality encoded blocks including the row of pixels to be decoded and inverse transform the row of pixels to be decoded, and upon determining the row of pixels to be decoded is not included in the row start, the row end or the rows there between, skip processing of the row of pixels to be decoded.

For example, during the single pass, the instructions can cause the processor to select a row of pixels to be decoded, determine whether the row of pixels to be decoded is the row end and upon determining the row of pixels to be decoded is the row end, determine whether a row of blocks of the plurality encoded blocks including the row of pixels to be decoded has been entropy decoded, upon determining the row of blocks of the plurality encoded blocks including the row of pixels to be decoded has been entropy decoded, inverse transform the row of pixels to be decoded, upon determining the row of blocks of the plurality encoded blocks including the row of pixels to be decoded has not been entropy decoded, entropy decode the row of blocks of the plurality encoded blocks including the row of pixels to be decoded and inverse transform the row of pixels to be decoded, and stop decoding.

For example, after completion of the single pass, the instructions can cause the processor to determine a column start and a column end within the image based on the boundary indicator and crop a decoded image based on the column start and the column end. During the single pass, the instructions can cause the processor to determine a column start and a column end within the image based on the boundary indicator, decode and inverse transform the plurality of encoded blocks that include the column start, the column end and the column there between, and skip processing of the remainder of the plurality of encoded blocks.

For example, during the single pass, the instructions can cause the processor to determine a column start and a column end within the image based on the boundary indicator, select a row of pixels to be decoded, determine whether the row of pixels to be decoded is included in the row start, the row end or the rows there between, upon determining the row of pixels to be decoded is included in the row start, the row end or the rows there between, determine whether a row of blocks of the plurality encoded blocks including the row of pixels to be decoded has been entropy decoded, upon determining the row of blocks of the plurality encoded blocks including the row of pixels to be decoded has been entropy decoded, inverse transform only pixels of the row of pixels to be decoded that are included in the column start, the column end or the columns there between, and upon determining the row of blocks of the plurality encoded blocks including the row of pixels to be decoded has not been entropy decoded, entropy decode the row of blocks of the plurality encoded blocks including the row of pixels to be decoded and inverse transform only pixels of the row of pixels to be decoded that are included in the column start, the column end or the columns there between, and upon determining the row of pixels to be decoded is not included in the row start, the row end or the rows there between, skip processing of the row of pixels to be decoded.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

Figure 1:
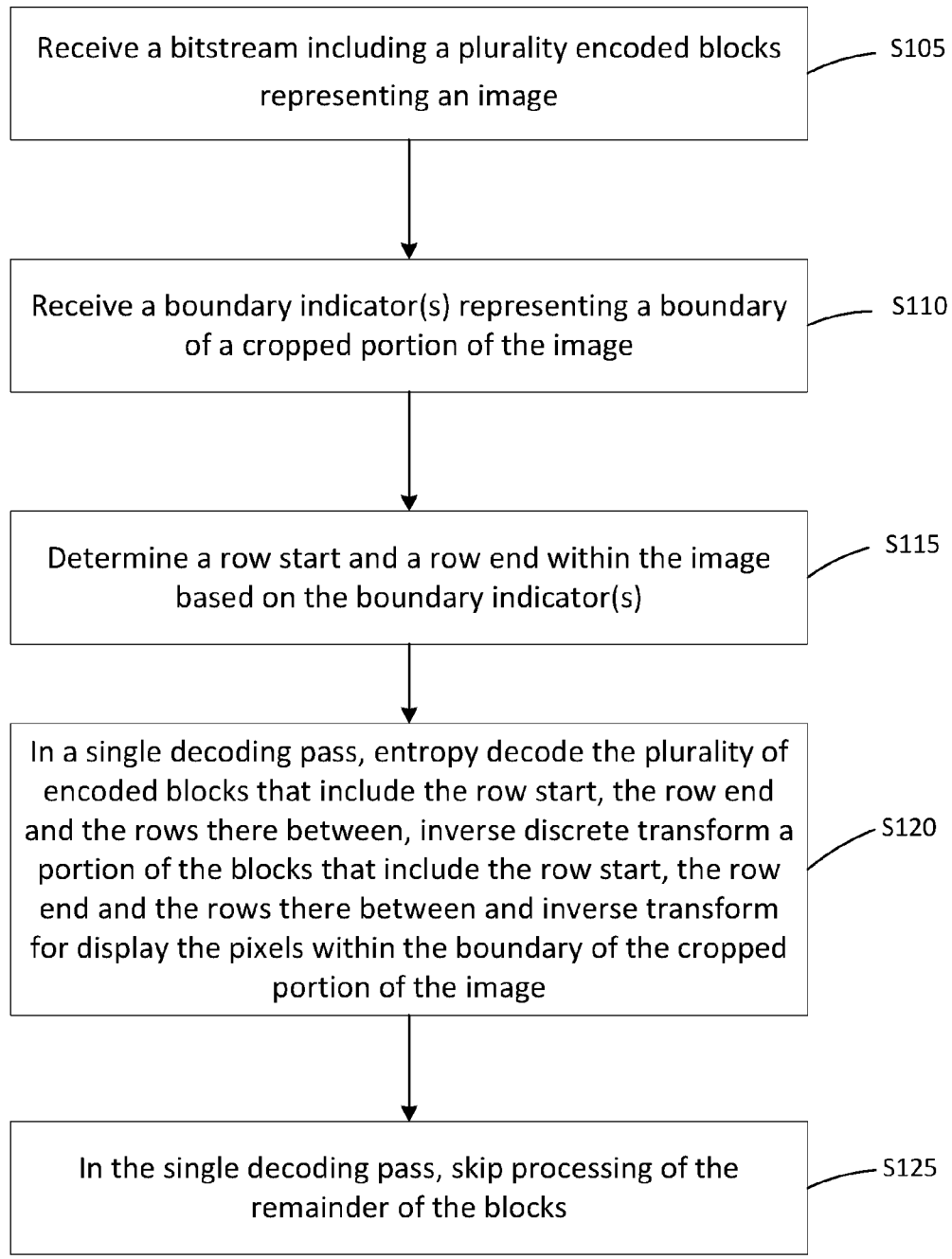
FIG. 1 illustrates a flowchart of a method for decoding an image according to at least one example embodiment.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Some images are cropped prior to being displayed. For example, a webpage may include an element configured to display an image. The image may be encoded and communicated to a user device for decoding and display in the webpage. However, before being displayed in the element of webpage the image is cropped based on a size of the element and/or based on the portion of image desired for display in the element. The element may be configured to display any image shape. Therefore, the cropped portion of the image (or subset of the original image) may be square, rectangle, oval circle, hexagonal, and/or the like.

According to example embodiments if a subset of an image is to be displayed, performance (e.g., efficiency or utilization of fewer resources) can be improved by decoding only the subset to be displayed rather than decoding the entire image and then cropping. Accordingly, an example implementation describes, when decoding an image having a cropped portion to be displayed, skipping the decoding of scanlines (hereinafter referred to as rows) including pixels outside of the image subset, image portion or cropped portion. In other words a remainder of the image (e.g., that which is not included in the cropped portion) is skipped or not completely decoded.

Joint Photographic Expert Group (JPEG) encodings can be described in at least two steps. The first step is to divide the image into blocks (e.g., an 8×8 block) and take the DCT of each block of pixels. Accordingly, each block is a set of, for example, 64 DCT coefficients instead of 64 pixels. Of these 64 DCT coefficients, many will be 0, so the result is further compressed by performing an entropy encoding on the coefficients. The entropy encoding is usually Huffman encoding but can also an arithmetic encoding.

In order to skip a block during the decode operation, the entropy decoding can be performed and then no processing is performed on the resultant coefficients. Therefore, in order to skip a row of blocks, the entropy decoding for all of the blocks in the row of blocks and do nothing with the coefficients. The performance cost (e.g., processor utilization) of entropy decoding is less as compared to the performance cost inverse DCT decoding, upsampling, and/or color conversion.

FIG. 1 illustrates a flowchart of method for decoding an image according to at least one example embodiment. As shown in FIG. 1, in step S105 a bitstream including a plurality encoded blocks representing an image is received. For example, a bitstream including blocks encoded using a JPEG codec can be received at a user device. The bitstream can be received in response to a request (e.g., a HTML request) for the corresponding image for display in an application (e.g., a web browser) executing on the user device.

In step S110, a boundary indicator(s) representing a boundary of a cropped portion of the image are received. For example, an element of a webpage being displayed in the web browser can have an associated tag (e.g., html tag) including a height attribute and a width attribute. Accordingly, the image can be cropped to the size of the element attribute. Cropping the image can include selecting the portion of the image (e.g., using y coordinates indicating row position and x coordinates indicating column position) to be displayed. For example, referring to FIG. 2A, the boundary indicator(s) can correspond to pixel positions of a portion of the image received via the bitstream. The image (e.g., image 200) can have a cropped portion 220 with a row start (e.g., R1), a row end (e.g., R2), a column start (e.g., C1) and a column end (e.g., C2) as boundary indicators indicating the location (within the image) of the boundary of the cropped portion (e.g., cropped portion 220) of the image (e.g., image 200). The boundary indicators can be received from the application (e.g., a web browser) executing on the user device as inputs to the codec (e.g., JPEG codec) used by the decoder (e.g., decoder 535) used to decode the bitstream (e.g., encoded image 250) representing the image (e.g., image 200).

In step S115, a row start and a row end within the image are determined based on the boundary indicators. For example, the row start and the row end can be extracted from the boundary indicators. Referring again to FIG. 2A, the extracted row start and row end can correspond to R1 and R2 respectively.

In step S120, in a single decoding pass, entropy decode the plurality of encoded blocks that include the row start, the row end and the rows there between and transform for display a portion (e.g., a subset) of the plurality of encoded blocks that include the rows including the cropped portion of the image. Transforming for display can include inverse discrete cosine transform (IDCT) a portion of the blocks that include the row start, the row end and the rows there between, upsampling pixels and color converting pixels within the boundary of the cropped portion of the image. For example, referring to FIG. 2B, blocks in rows 260, 265 and 270 (and above) can be entropy decoded. This is also illustrated as including block groups 275 (hashed) and 280 (crossed). Then the portion of the blocks in rows 260, 265 and 270 can be IDCT. The portion of blocks is also illustrated as including block group 275 (hashed). Finally, referring to FIG. 2A, the pixels within the boundary illustrated as within row R1 and row R2 (as well as include row R1 and row R2) and column C1 and column C2 (as well as include column C1 and column C2) (e.g., cropped portion 220) can be inverse transformed for display (e.g., upsampled and color converted).

In step S125, in the single decoding pass, processing of the remainder (e.g., remainder 225) of the blocks is skipped. For example, referring to FIG. 2B rows (or rows of pixels) included in block group 285 are skipped (e.g., not entropy decoded and not inverse transformed) and, referring to FIG. 2A, rows above (or before) R1 and below (or after) R2 are skipped (e.g., not IDCT transformed, not upsampled, not color converted and/or possibly not entropy decoded). In other words, the remainder (e.g., not including the cropped portion 220) can be some portion block group 275 (hashed), block group 280 (crossed) and/or block group 285. As such the remainder can include (at least one of) a block, a portion of a block, a row and/or a pixel that has not been inverse transformed for display. Not being inverse transformed for display can include at least one of not color converting, not upsampling, not IDCT and/or not entropy decoding the block, the portion of a block, the row and/or the pixel.

Figure 2A:
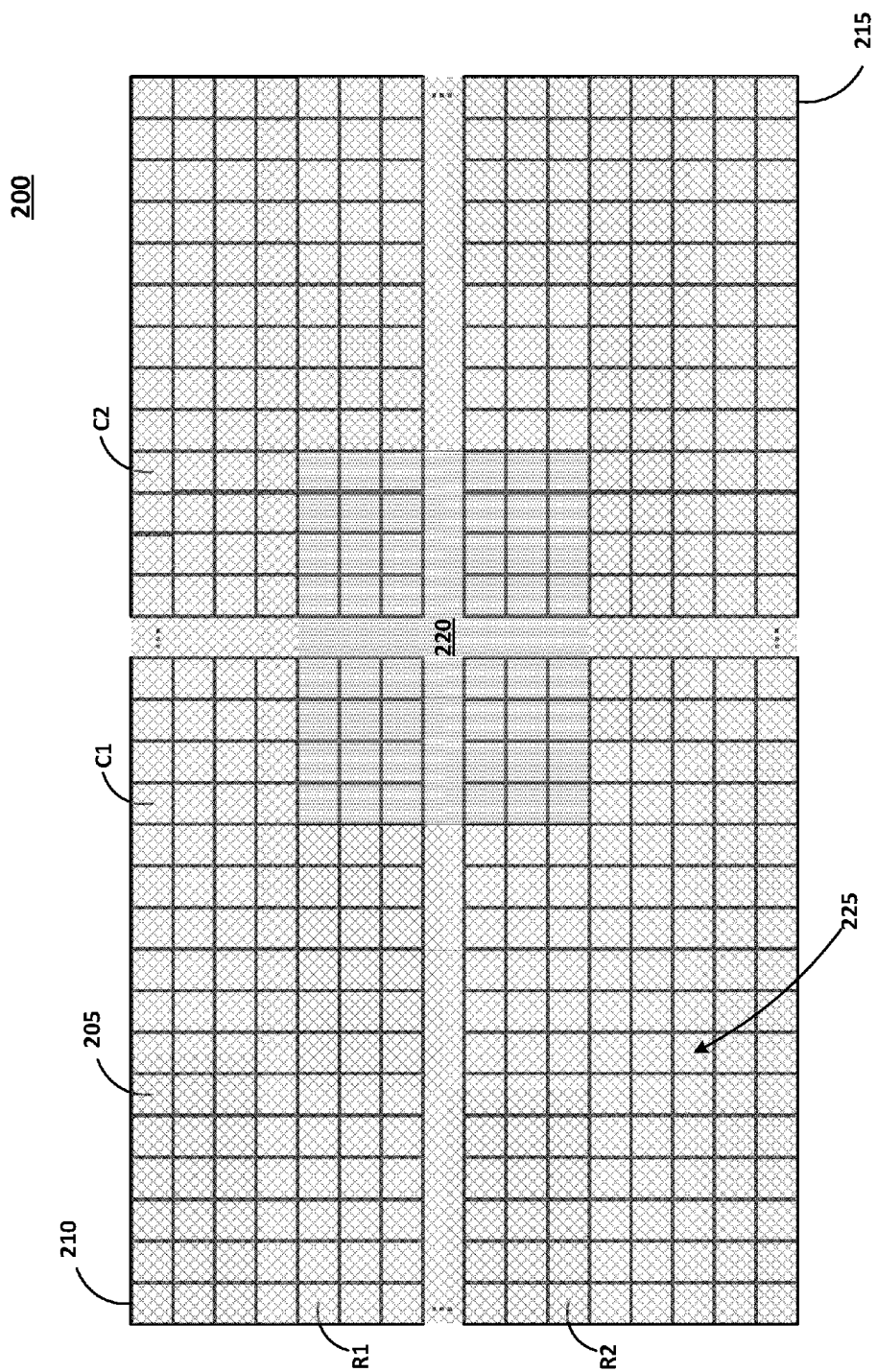
FIGS. 2A and 2B illustrate images and portions of images according to at least one example embodiment.
Figure 2B:
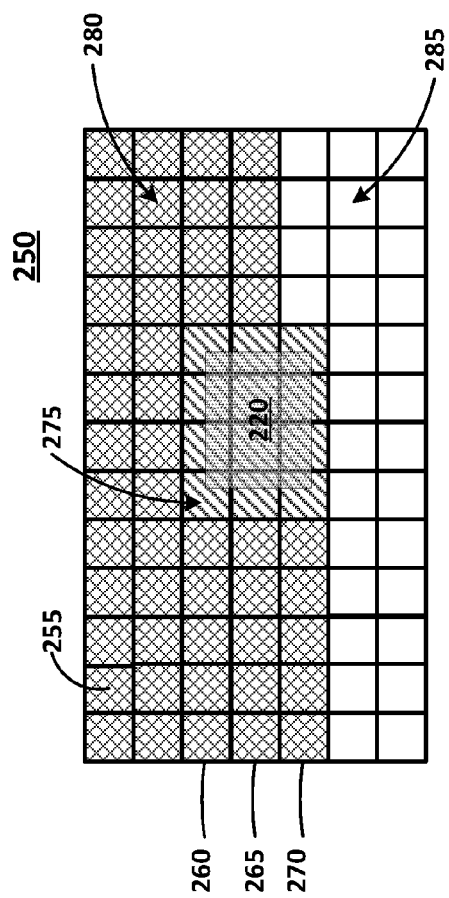

FIGS. 2A and 2B illustrate images and portions of images according to at least one example embodiment. FIG. 2A illustrates an image 200 including a plurality of pixels 205. The image includes a first pixel 210 at x,y coordinates 0,0 and a last pixel 215 x,y coordinates $R_L,C_L$ (subscript L representing last) noting the actual coordinate of the last pixel will vary based on the size of the image 200. As shown in FIG. 2A, the image has a cropped portion 220. The cropped portion 220 may be indicated for display in, for example, a web page displayed on a user device. As shown, cropped portion 220 has boundary indicators shown as an associated row start at row R1, an associated row stop at row R2, an associated column start as column C1 and an associated column stop at column C2.

The portion of the image not including the cropped portion 220 (or remainder of the image) is illustrated as remainder 225. Boundary indicator(s) can be in any form that identifies the boundary of the cropped portion 220. For example, the boundary indicator could be a center and radius for a circle. The boundary indicator could also be a map or a table including pixel positions. These examples of boundary indicators are just a few non-limiting examples.

The cropped portion is illustrated as a rectangle. However, example embodiments are not limited thereto. For example, the cropped portion 220 of the image may be square, rectangle, oval circle, hexagonal, and/or the like. Therefore, the boundary indicators can be in any format (e.g., based on shape) that can be used to determine the bounds of the cropped portion 220.

FIG. 2B illustrates an encoded image 250 including a plurality of blocks 255. The blocks 255 are sometimes called minimum coded units (MCUs). For example, in JPEG or JPEG compression, a source image (e.g., image 200) can be divided into a plurality of blocks referred to as MCUs. Each MCU of each block can include at least one (often several) 8×8 block of pixel components from the source image. The height and width of the MCUs can be based on horizontal and vertical sampling parameters. During an encoding process (described in more detail below), the MCUs can be processed from left to right and then top to bottom across the source image. Hereinafter a MCU is referred to as a block as in a block of the plurality of blocks 255.

In the example implementation shown in FIG. 2B, the encoded image 250 includes block groups 275, 280 and 285 as well as the cropped portion 220. A position of an the number of blocks in each of block groups 275, 280 and 285 can be based on (e.g., the location of and the size of) the cropped portion 220. Block group 275 can be a block group including blocks that have been (or are to be) entropy decoded and IDCT transformed because block group 275 includes cropped image 220. Pixels within the boundary of cropped image 220 should also be inverse transformed for display. In other words, some portion of block group 275 can be entropy decoded and IDCT transformed, upsampled and color converted while another portion of block group 275 is only entropy decoded and IDCT transformed. Block group 280 includes blocks that have been entropy decoded (e.g., in order to determine block positions) and block group 285 may not be decoded (e.g., not processed) or can be skipped.

Figure 3:
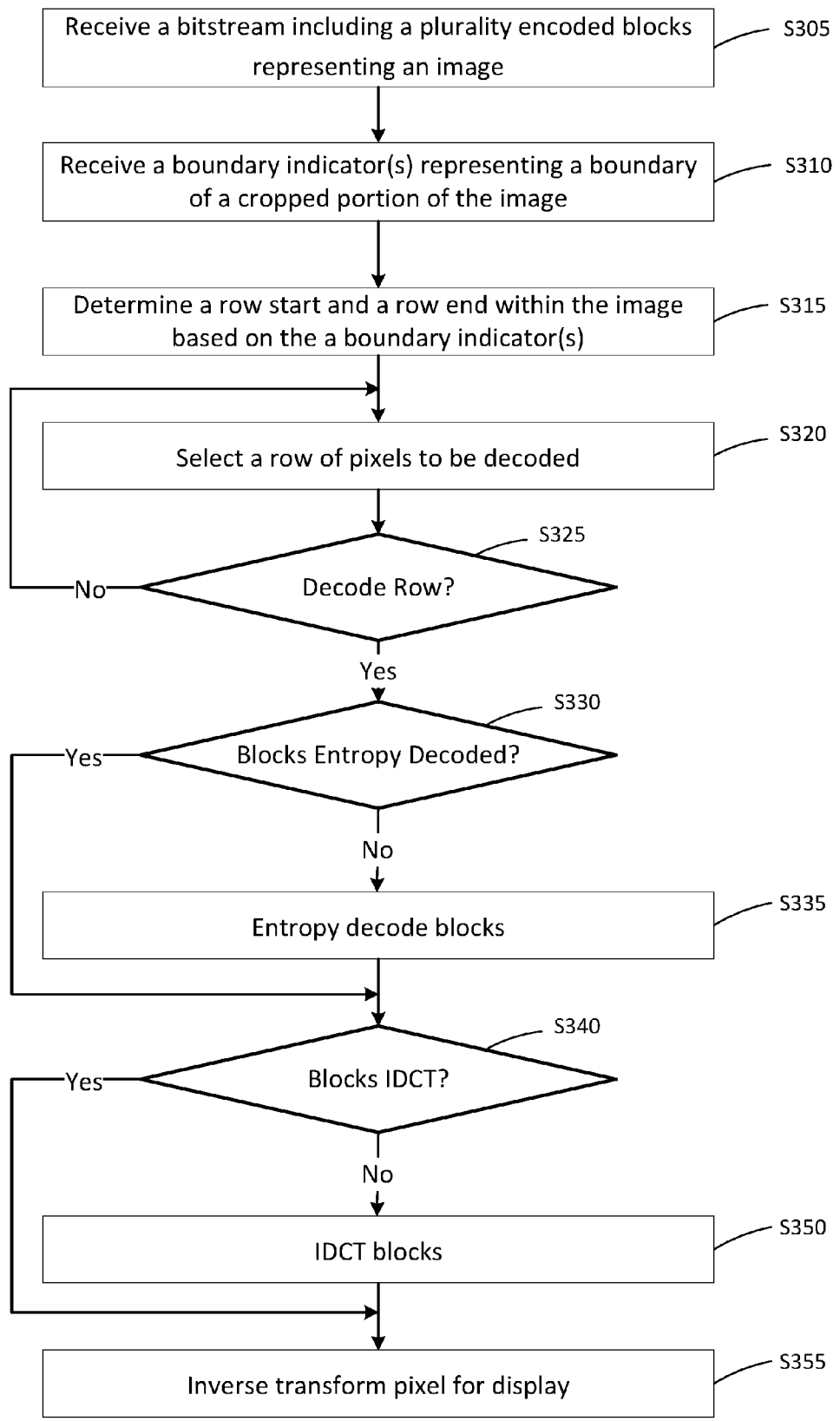
FIG. 3 illustrates a flowchart of a method for decoding an image according to at least one example embodiment.

FIG. 3 illustrates a flowchart of a method for decoding an image according to at least one example embodiment. As shown in FIG. 3, in step S305 a bitstream including a plurality encoded blocks representing an image is received.

For example, a bitstream including blocks encoded using a JPEG codec can be received at a user device. The bitstream can be received in response to a request (e.g., a HTML request) for the corresponding image for display in an application (e.g., a web browser) executing on the user device.

In step S310, a boundary indicator(s) representing a boundary of a cropped portion of the image are received. For example, an element of a webpage being displayed in the web browser can have an associated tag (e.g., html tag) including a height attribute and a width attribute. Accordingly, the image can be cropped to the size of the element attribute. Cropping the image can include selecting the portion of the image (e.g., using y coordinates indicating row position and x coordinates indicating column position) to be displayed. For example, referring to FIG. 2A, the boundary indicator(s) can correspond to pixel positions of a portion of the image received via the bitstream. The image (e.g., image 200) can have a cropped portion 220 with a row start (e.g., R1), a row end (e.g., R2), a column start (e.g., C1) and a column end (e.g., C2) as the boundary indicator(s) representing the cropped portion (e.g., cropped portion 220) of the image (e.g., image 200). The boundary indicator(s) can be received from the application (e.g., a web browser) executing on the user device as inputs to the codec (e.g., JPEG codec) used by the decoder (e.g., decoder 535) used to decode the bitstream (e.g., encoded image 250) representing the image (e.g., image 200).

In step S315, a row start and a row end within the image are determined based on the boundary indicator(s). For example, the row start and the row end can be extracted from the boundary indicator(s). Referring again to FIG. 2A, the extracted row start and row end can correspond to R1 and R2 respectively.

In step S320, a row of pixels to be decoded is selected. For example, according to an example implementation, rows can be selected one at a time starting with row 0 and then continuously looping until the last row or the last relevant (e.g., the last row that includes pixels to be displayed) has been selected and/or decoded. In another example implementation, the first row can be selected as the row start.

In step S325, whether or not the row of pixels should be decoded is determined. Upon determining the row of pixels should be decoded, processing continues to step S330. Otherwise, processing returns to step S320 where a subsequent or next row of pixels to be decoded is selected. For example, referring to FIG. 2A, if the row of pixels includes and is between row R1 and row R2 the row of pixels should be decoded.

In step S330, whether or not the blocks including the row of pixels to be decoded has been entropy decoded is determined. Upon determining the blocks including the row of pixels to be decoded have been entropy decoded, processing continues to step S340. Otherwise, processing continues to step S335 and then on to step S340. For example, an encoder (e.g., encoder 430) using a JPEG codec is configured to generate an encoded bitstream including blocks (e.g., encoded blocks 255) of encoded video data where boundaries between the encoded blocks are not known because the encoded blocks may not have a fixed size and there may be no markers demarcating the block boundaries. Accordingly, in order to decode a row of video data, blocks including the row and each preceding block (e.g., based on an encoding order) should be entropy decoded, because the entropy decoding indicates the position of the start of the next block. Accordingly, determining whether or not the blocks including the row of pixels to be decoded has been entropy decoded can include determining whether or not the previous blocks have been entropy decoded.

In step S335, the blocks including the row of pixels to be decoded are entropy decoded. For example, each block including the row of pixels to be decoded (and any previous blocks that may be used to determine a block boundary) are entropy decoded using an entropy decoding (e.g., Huffman decoding) schema. For example, any blocks used to find the boundaries of the current block (that have not previously been entropy decoded) can be entropy decoded using an entropy decoding (e.g., Huffman decoding) schema.

Referring to FIG. 2B upon determining the row of pixels to be decoded are included in row 260, the blocks prior to row 260 can be entropy decoded and row 260 can be entropy decoded. Further, upon determining a row in block 270 is the last row to be decoded, entropy decoding can stop (or be skipped) for subsequent blocks. This entropy decoding and skipping of entropy decoding can be shown as block group 280 being entropy decoded and block group 285 being skipped.

In step S340, whether or not the blocks including the cropped portion to be decoded has been IDCT transformed is determined. Upon determining the blocks including the cropped portion to be decoded has been IDCT transformed, processing continues to step S355. Otherwise, processing continues to step S350 and then on to step S355. For example, IDCT can be performed by block in a JPEG coded. Accordingly, block group 275 should be IDCT transformed (if not already IDCT transformed) because a portion of block group 275 includes the cropped portion 220.

In step S355, the pixels to be displayed are inverse transformed for display. For example, the pixels (or a portion thereof) in the row can be dequantized (prior step), inverse DCT transformed (prior step), upsampled and color converted. In other words, a pixel that is inverse transformed for display can be a pixel in a block that has been entropy decoded and IDCT transformed. The pixel is also upsampled and color converted. For example, a row of pixels in a block (or plurality of blocks) can be upsampled and color converted if the block including the pixel has been entropy decoded and IDCT transformed. Otherwise, the block (or plurality of blocks) is entropy decoded and IDCT transformed before the pixel (or row of pixels) is upsampled and color converted.

The aforementioned techniques (e.g., those described with regard to FIGS. 1 and 3) can be more efficient than other techniques for cropping images. For example, example implementations use a single pass whereas other techniques use at least two passes. For example, other techniques can entropy decode the entire encoded image in a first pass operation. Then in a second pass operation dequantize, inverse DCT transform, upsample and color convert pixels. Finally, in a third operation, the decoded image is cropped. Some of these techniques can perform the cropping operation during the second pass operation.

By contrast, the single pass operation described with regard to example implementations entropy decode and dequantize, inverse DCT transform, upsample and color convert pixels during the single pass. The single pass operation described with regard to example implementations is more efficient at least because the only the necessary blocks are entropy decoded and the inverse transformation of pixels (the most processor intensive operations) is only performed on the desired pixels.

In an example implementation based on a JPEG codec, a single pass can be decoding block by block starting with a first block in an upper left hand corner and proceeding along a row then dropping down to the next row until the last block is decoded. In other words, processing blocks in a zig-zag flow. According to the example implementation, when a block is chosen (e.g., starting with the first block) for the first time, the block is entropy decoded. If no rows in the block include the cropped image (e.g., cropped portion 220) processing on the block ends and the next block is chosen. These blocks are shown as block group 280 in FIG. 2B.

If rows in the block include the cropped image (e.g., cropped portion 220) processing on the block continues with performing an IDCT. These blocks are shown as block group 274 in FIG. 2B. Then row by row (within the block) a determination as to whether or not the row is within the boundary of the cropped image. If the row is within the boundary of the cropped image, upscaling and color conversion is performed on the row (or a portion thereof). Otherwise, the row is skipped. Processing continues block by block until the blocks including the cropped image are processed (e.g., decoded or partially decoded). Then, the remaining blocks are skipped. The skipped blocks are shown as block group 285 in FIG. 2B.

Figure 4:
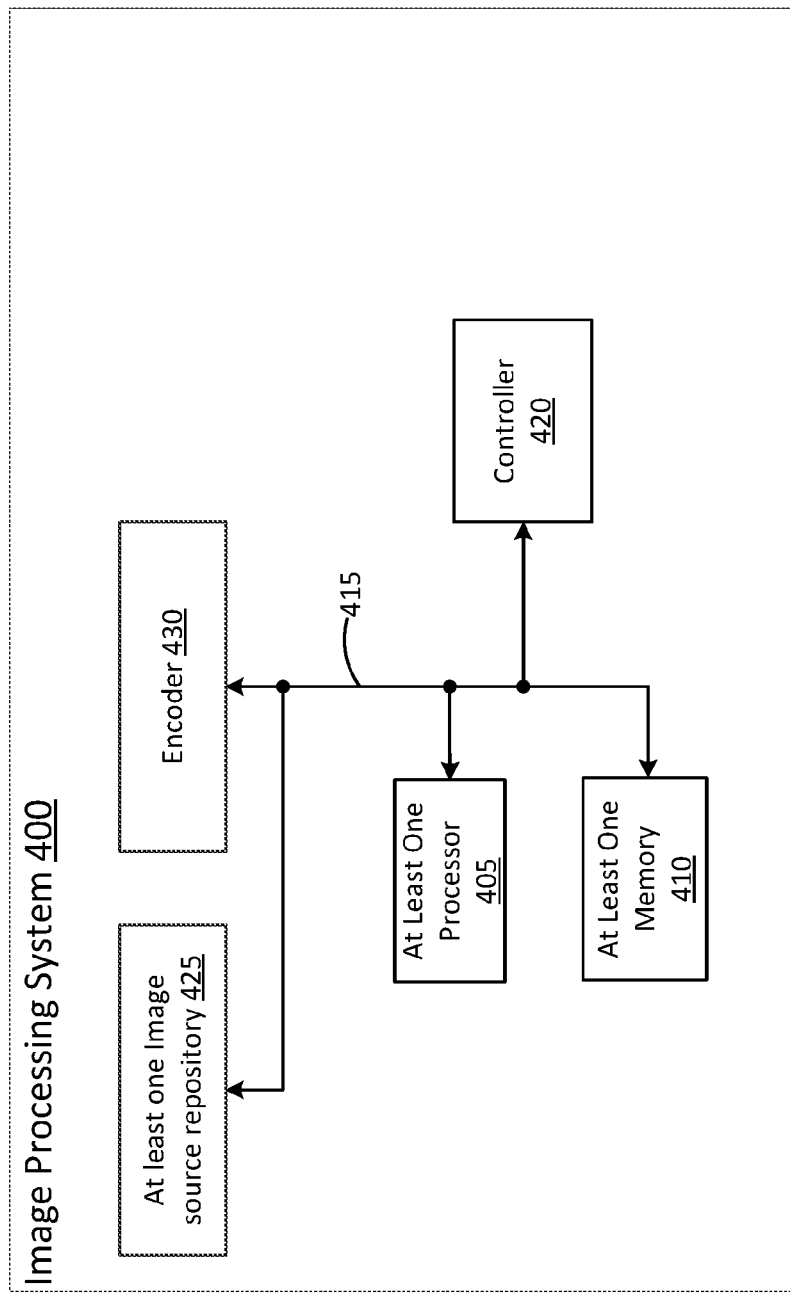
FIGS. 4 and 5 illustrate block diagrams of image processing systems according to at least one example embodiment.
Figure 5:
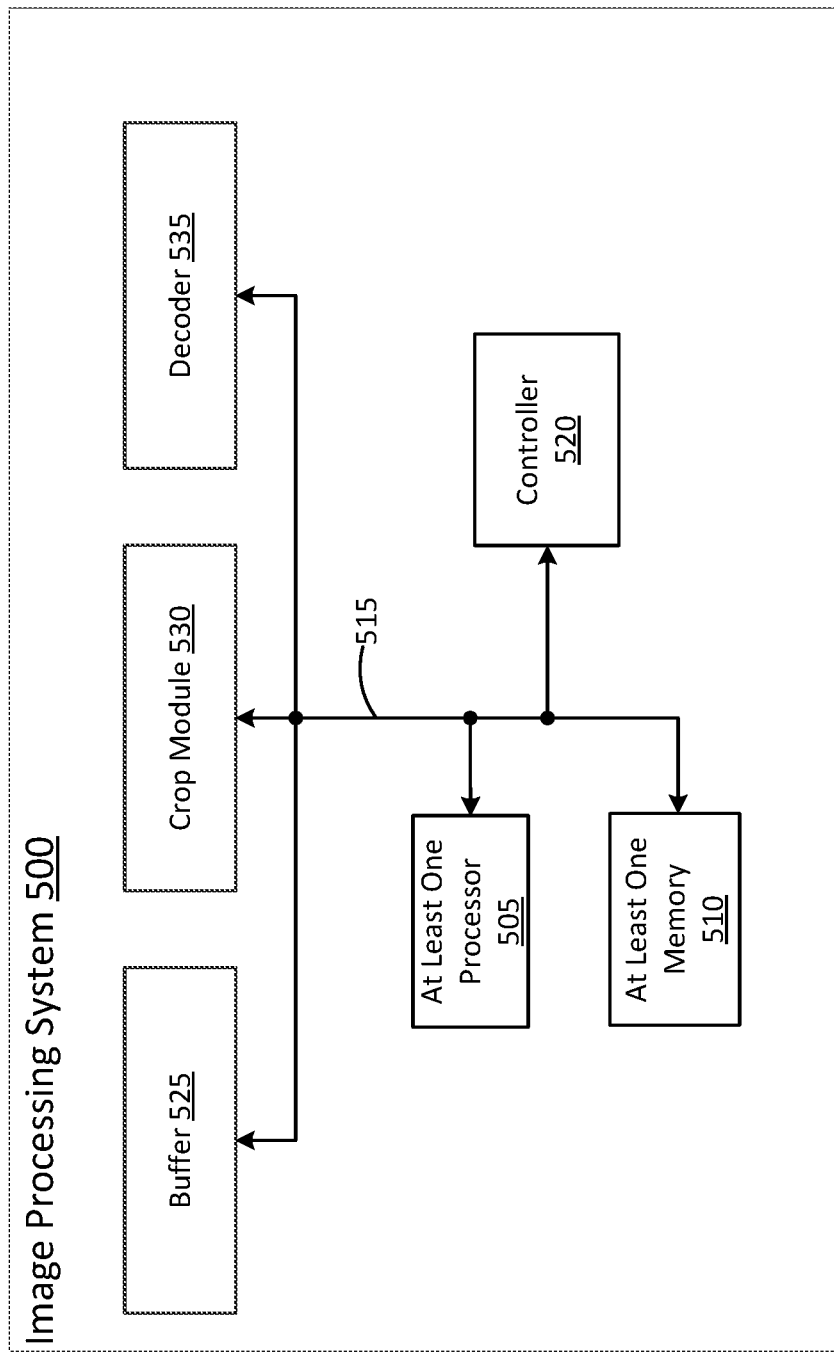

FIGS. 4 and 5 illustrate block diagrams of image processing systems according to at least one example embodiment. As shown in FIG. 4, an image processing system 400 includes at least one processor 405, at least one memory 410, a controller 420, an at least one image source repository 425 and an encoder 430. The at least one processor 405, the at least one memory 410, the controller 420, the at least one image source repository 425 and the encoder 430 are communicatively coupled via bus 415.

The at least one processor 405 may be utilized to execute instructions stored on the at least one memory 410, so as to thereby implement the various features and functions described herein, or additional or alternative features and functions. The at least one processor 405 and the at least one memory 410 may be utilized for various other purposes. In particular, the at least one memory 410 can represent an example of various types of memory and related hardware and software which might be used to implement any one of the modules described herein.

The at least one memory 410 may be configured to store data and/or information associated with the image processing system 400. For example, the at least one memory 410 may be configured to store codecs associated with encoding images and/or algorithms for selecting a portion of an image. For example, the at least one memory 410 may be configured to store code associated with selecting a portion of an image based on available system resources. The at least one memory 410 may be a shared resource. For example, the image processing system 400 may be an element of a larger system (e.g., a server, a personal computer, a mobile device, and the like). Therefore, the at least one memory 410 may be configured to store data and/or information associated with other elements (e.g., image/video serving, web browsing or wired/wireless communication) within the larger system.

The controller 420 may be configured to generate various control signals and communicate the control signals to various blocks in image processing system 400. The controller 420 may be configured to generate the control signals to implement the techniques described herein. The controller 420 may be configured to control the encoder 430 to encode an image, a portion of an image, a plurality of images, and the like according to example embodiments.

The encoder 430 may be configured to receive an image input (e.g., from the at least one image source repository 425) and output compressed (e.g., encoded) image bits. The encoder 435 may further convert each image (or portion of an image) into a matrix of blocks (e.g., as shown in FIG. 2B). For example, an image may be converted to a 16×16, a 16×8, an 8×8, a 4×4, a 4×2 or a 2×2 matrix of blocks each having a number of pixels. Although six example matrices are listed, example embodiments are not limited thereto. The encoder 430 may be configured to generate the bitstream including a plurality encoded blocks representing an image described above with regard to FIGS. 1 and 3.

The at least one image source repository 425 can be configured to store an image, metadata associated with the image data and/or other image data. In one implementation, the at least one image source repository 425 is a volatile memory unit or units. In another implementation, the at least one image source repository 425 is a non-volatile memory unit or units. The at least one image source repository 425 may also be another form of computer-readable medium, such as a magnetic or optical disk. The at least one image source repository 425 can be a non-transitory computer readable medium.

FIG. 5 illustrates a block diagram of another image processing system according to at least one example embodiment. As shown in FIG. 5, an image processing system 500 includes at least one processor 505, at least one memory 510, a controller 520, a buffer 525, a crop module 530 and a decoder 535. The at least one processor 505, the at least one memory 510, the controller 520, the buffer 525, the crop module 530 and the decoder 535 are communicatively coupled via bus 515.

The at least one processor 505 may be utilized to execute instructions stored on the at least one memory 510, so as to thereby implement the various features and functions described herein, or additional or alternative features and functions. The at least one processor 505 and the at least one memory 510 may be utilized for various other purposes. In particular, the at least one memory 510 can represent an example of various types of memory and related hardware and software which might be used to implement any one of the modules described herein.

The at least one memory 510 may be configured to store data and/or information associated with the image processing system 500. For example, the at least one memory 510 may be configured to store codecs associated with decoding images and/or algorithms for replacing an image in a webpage. For example, the at least one memory 510 may be configured to store code associated with decoding an image using a JPEG decoding codec. According to at least one example implementation, the JPEG decoding codec may be modified to implement the cropping techniques described herein. The at least one memory 510 may be a shared resource. For example, the image processing system 500 may be an element of a larger system (e.g., a server, a personal computer, a mobile device, and the like). Therefore, the at least one memory 510 may be configured to store data and/or information associated with other elements (e.g., image/video serving, web browsing or wired/wireless communication) within the larger system.

The controller 520 may be configured to generate various control signals and communicate the control signals to various blocks in image processing system 500. The controller 520 may be configured to generate the control signals to implement the techniques described herein. The controller 520 may be configured to control the decoder 535 to decode an image, a portion of an image, a plurality of images, and the like according to example embodiments. For example, the controller 520 may generate control signals corresponding to parameters to implement image cropping while decoding an image.

The decoder 535 may be configured to receive compressed (e.g., encoded) image bits and output a corresponding image. The decoder 535 may further upscale and color convert a decoded image (or portion of an image) for rendering the image on a display of a computing device (e.g., a user device displaying a web page). The buffer 525 can be a memory (e.g., a temporary or volatile memory) configured to store compressed bits representing an image before decoding and/or to store an image after decoding and prior to being rendered on a display associated with the user device 115, 120. The buffer 525 can be a reserved portion of the at least one memory 510. Alternatively, or in addition to, the buffer 525 can be a standalone memory.

In some implementations, the crop module 530 can resize or crop the image while decoding the image based on, for example, an element of the webpage in which the image is to be displayed. In example implementations, the crop module 530 and the decoder 535 together may be configured to implement the techniques described above with regard to FIGS. 1 and 3. For example, the element of the webpage can have an associated tag (e.g., html tag) including a height attribute and a width attribute. Accordingly, the image can be cropped to the size of the element attribute. Cropping the image can include selecting the portion of the image (e.g., using y coordinates indicating row position and x coordinates indicating column position) to be displayed.

Figure 6:
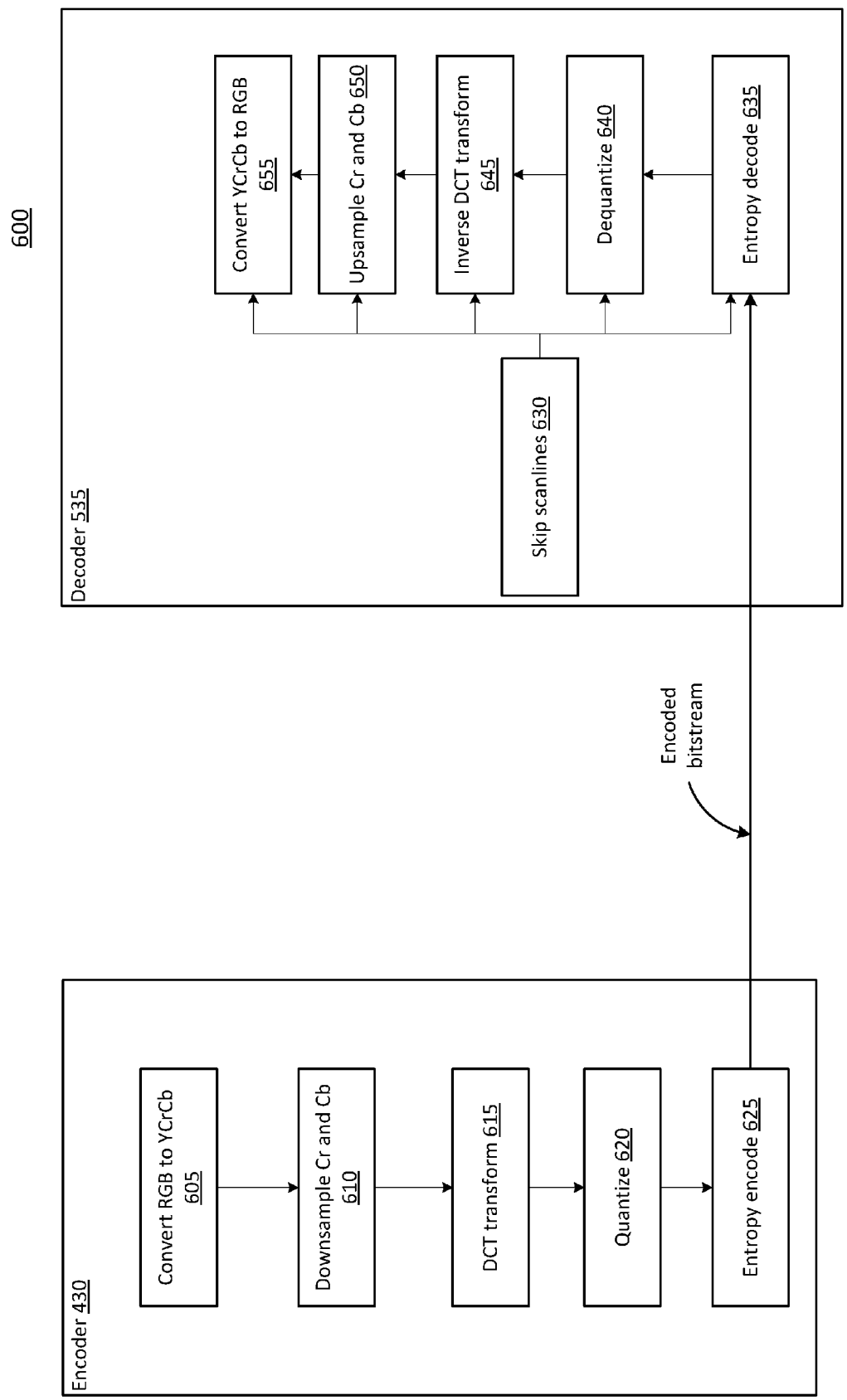
FIG. 6 illustrates a block diagram of an encoding and decoding signal flow according to at least one example embodiment.

FIG. 6 illustrates a block diagram of an encoding and decoding signal flow according to at least one example embodiment. As shown in FIG. 6, the encoder 430 (which is also shown in FIG. 4) includes a convert RGB to YCrCb block 605, a downsample Cr and Cb block 610, a DCT transform block 615, a quantize block 620 and an entropy encode block 625. As shown in FIG. 6, the decoder 535 (which is also shown in FIG. 5) includes a skip scanlines block 630, an entropy decode block 635, a dequantize block 640, an inverse DCT transform block 645, an upsample Cr and Cb block 650 and a convert YCrCb to RGB block 655.

The convert RGB to YCrCb block 605 can be configured to convert the RGB (red, green, and blue) values of the pixels in a source image (e.g., image 200) to YCrCb (luminance and chrominance) values. For example, ITU-RBT.601 establishes the following formulas for converting from the RGB color space to the YCbCr color space:

$$Y = 0.299R + 0.587G + 0.114B \quad (1)$$

$$Cb = 0.564(B-Y) \quad (2)$$

$$Cr = 0.713(R-Y) \quad (3)$$

Color space conversion can be implemented using multipliers or look-up tables to achieve the multiplication operations, and by combining the resultant component products to complete the conversion. The multiplication operations can affect the operating efficiency. Therefore, the number of multiplication operations can be processor intensive. In an example implementation, a 3-by-3 multiplication can be used for converting between any two color spaces of three color components. To perform the RGB to YCbCr color space conversion using equations (1) to (3), convert RGB to YCrCb block 605 can be configured to perform (or instruct a processor to perform) three multiplication operations to obtain the Y color signal, and then derive the (B−Y) and (R−Y) color difference signals before performing two more multiplication operations to obtain the Cb and Cr color signals, respectively.

Figure 2C:
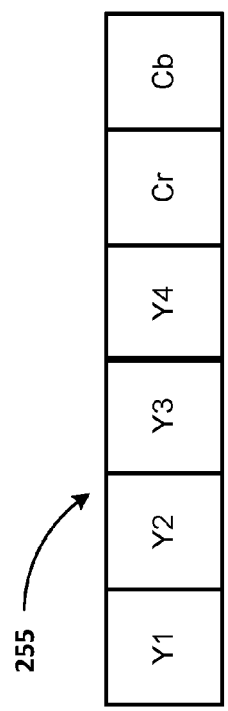
FIG. 2C illustrates an encoded block according to at least one example embodiment.

The downsample Cr and Cb block 610 can be configured to separate the Y, Cr, and Cb components into three planes. For example, the Y values can be fully sampled and the Cr and the Cb values can be downsampled as, for example, a ¼ vertical and horizontal downsample of the Cr and the Cb values. The downsample Cr and Cb block 610 can then interleave the Y, Cb, and Cr as shown in FIG. 2C where each block 255 includes a Y1, Y2, Y3, Y4, Cr, and Cb value.

The DCT transform block 615 may be configured to convert the values of the pixels from the spatial domain to transform coefficients in a transform domain. The transform coefficients may correspond to a two-dimensional matrix of coefficients that is ordinarily the same size as the original block. In other words, there may be as many transform coefficients as pixels in the original block. However, due to the transform, a portion of the transform coefficients may have values equal to zero.

The DCT transform block 615 may be configured to transform the pixel values of block 255 into transform coefficients in, for example, the frequency domain. Typically, transforms include the Karhunen-Loève Transform (KLT), the Discrete Cosine Transform ("DCT") and the Singular Value Decomposition Transform ("SVD").

The quantize block 620 may be configured to reduce the data in each transformation coefficient. Quantization may involve mapping values within a relatively large range to values in a relatively small range, thus reducing the amount of data needed to represent the quantized transform coefficients. The quantize block 620 may convert the transform coefficients into discrete quantum values, which are referred to as quantized transform coefficients or quantization levels. For example, the quantize block 620 may be configured to add zeros to the data associated with a transformation coefficient. For example, an encoding standard may define 128 quantization levels in a scalar quantization process.

The entropy encode block 625 can be configured to perform entropy encoding (e.g., Huffman encoding, arithmetic encoding and/or the like) to the blocks 255. After encoding all the blocks 255 that corresponding to the source image (e.g., image 200), the encoder 430 has generated an encoded bitstream where boundaries between the encoded blocks 255 are not known because the encoded blocks may not have a fixed size and there may be no markers demarcating the block 255 boundaries.

The entropy decode block 635 can be configured to perform entropy decoding (e.g., Huffman decoding) to the bitstream (e.g., as implemented in FIGS. 1 and 3). In performing entropy decoding, the decoder 535 can determine the blocks in the order (e.g., location) which they were encoded in bitstream. However, the decoder 535 cannot determine the location of a block before the decoder 535 entropy decodes at least one preceding block in the bitstream because the encoded blocks do not have a fixed size and there are no markers demarcating block boundaries. Therefore, for a block to be decoded, the preceding blocks in the bitstream should be entropy decoded in order to determine the location of the requested block.

As implemented in FIGS. 1 and 3, the dequantize block 640 can be configured to dequantize the quantized transform coefficients, and inverse DCT transform block 645 inverse transforms (e.g., using ADST) the dequantized transform coefficients to produce a derivative residual that can be identical to that created by the downsample Cr and Cb block 610. The upsample Cr and Cb block 650 and the convert YCrCb to RGB block 655 upsample the Cr and the Cb values and convert the YCrCb values to RGB using inverse algorithms as compared to the convert RGB to YCrCb block 605 and the downsample Cr and Cb block 610 in order to generate RGB value for display.

Figure 7:
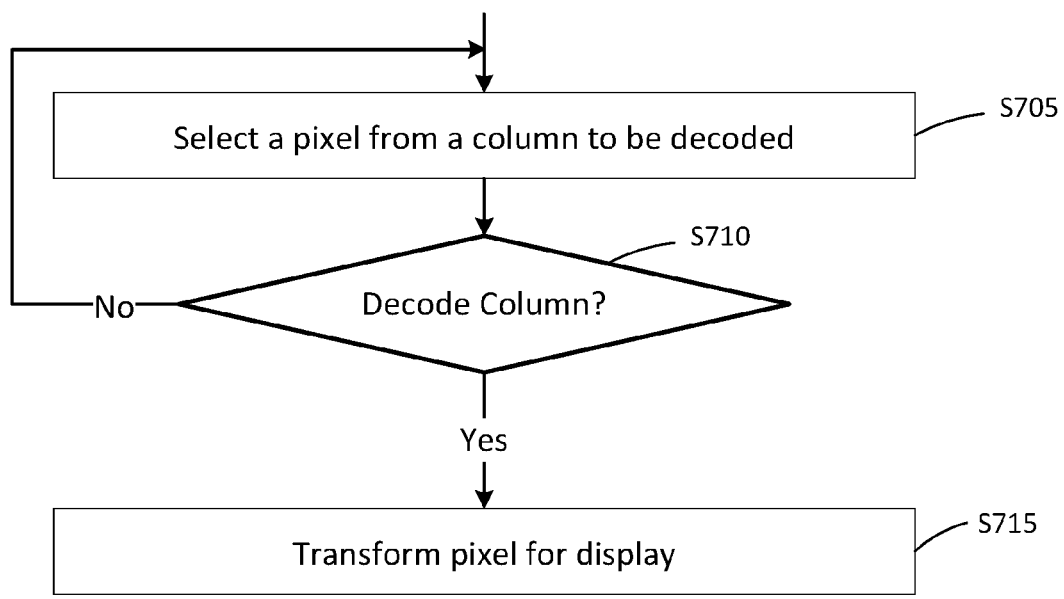
FIG. 7 illustrates a flowchart of a method for decoding an image according to at least one example embodiment.

The example implementations described above with regard to FIGS. 1 and 3 can be extended to include selectively decoding or skipping columns as well. FIG. 7 illustrates a flowchart of method for decoding an image according to at least one example embodiment. As shown in FIG. 7, in step S705 a pixel from a column to be decoded is selected. For example, according to an example implementation once a row is targeted for decoding, columns can be selected one at a time starting with column 0 and then continuously looping until the last column or the last relevant (e.g., the last column that includes pixels to be displayed) has been selected and/or decoded. In another example implementation, the first column can be selected as the column start or first column of the subset of pixels (cropped image) to be displayed. The column can also be associated with a block in which the pixel is located. Therefore, decoding can include the steps associated with decoding a block as well as decoding the pixel.

In step S710, whether or not the column of pixels should be decoded is determined. Upon determining the column of pixels should be decoded, processing continues to step S715. Otherwise, processing returns to step S705 where a pixel from a subsequent or next column to be decoded is selected. For example, referring to FIG. 2A, if the column of pixels includes and is between row C1 and row C2 the column of pixels should be decoded. In step S715, the pixel in the row of the column of pixels to be decoded is transformed for display. For example, the pixels (or a portion thereof) can be dequantized (if not already as part of a block operation), inverse DCT transformed (if not already as part of a block operation), upsampled and color converted.

For example, referring to FIG. 2B, if row 260 is selected, the first five blocks can be entropy decoded and not transformed for display (or otherwise skipped). In other words, the blocks of row 260 included in block group 280 can be entropy decoded and not transformed for display. The next four blocks can be IDCT transformed and a portion (or subset) also upsampled and color converted. In other words, the blocks of row 260 included in block group 275 can be entropy decoded, IDCT transformed and a portion (e.g., the portion within the boundaries of the cropped portion 220) can be transformed for display. A similar process can be executed on row 270. However, the last four blocks of row 270 may not be decoded at all or skipped. In other words, the blocks of row 270 included in block group 285 can be skipped.

FIGS. 1, 3, and 7 are flowcharts of methods according to example embodiments. The steps described with regard to FIGS. 1, 3, and 7 may be performed due to the execution of software code stored in a memory (e.g., at least one memory 410, 510) associated with an apparatus (e.g., as shown in FIGS. 4 and 5) and executed by at least one processor (e.g., at least one processor 405, 505) associated with the apparatus. However, alternative embodiments are contemplated such as a system embodied as a special purpose processor. Although the steps described below are described as being executed by a processor, the steps are not necessarily executed by a same processor. In other words, at least one processor may execute the steps described below with regard to FIGS. 1, 3, and 7.

Figure 8:
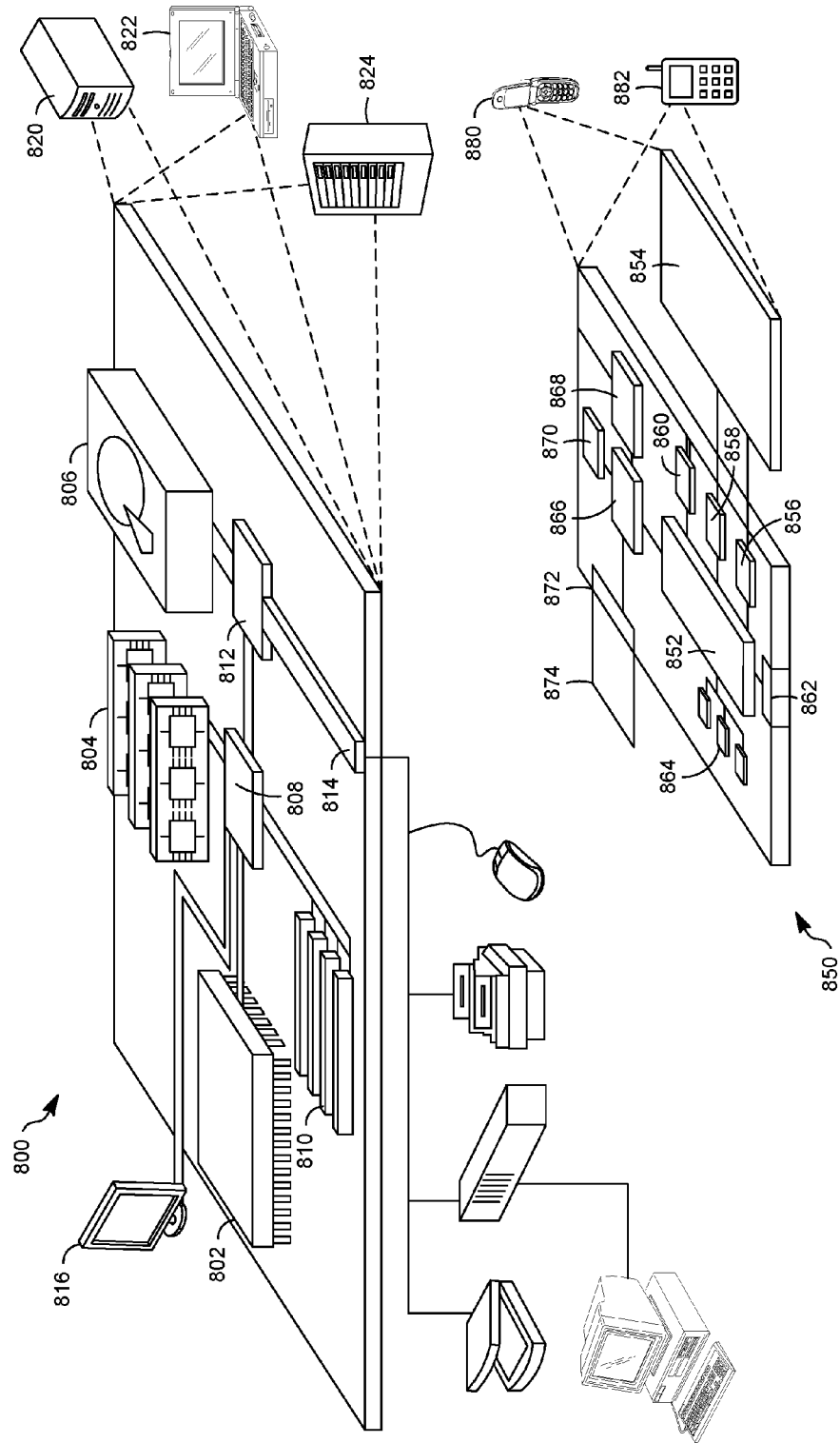
FIG. 8 shows an example of a computer device and a mobile computer device according to at least one example embodiment.

FIG. 8 shows an example of a computer device 800 and a mobile computer device 850, which may be used with the techniques described here. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. 8 computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, Wi-Fi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. An image decoder comprising:
 a processor; and
 a memory, the memory including instructions configured to cause the processor to:
  receive a bitstream including a plurality of encoded blocks representing an image,
  receive an indication of a cropped portion of the image, and
  in a single decoding pass, entropy decode the plurality of encoded blocks that include at least the cropped portion of the image to generate a plurality of entropy decoded blocks, inverse transform the plurality of entropy decoded blocks to generate a plurality of inverse transformed blocks, and upsample and color convert, for display, pixels included in a portion of the plurality of inverse transformed blocks that correspond to the cropped portion of the image, and skip the single decoding pass for encoded blocks that do not include at least the cropped portion of the image.

2. The image decoder of claim 1, wherein each of the plurality of encoded blocks are independently encoded and an entropy decoded one of the plurality of encoded blocks indicates a start position of a next of the plurality of encoded blocks.

3. The image decoder of claim 1, wherein the encoded blocks representing the image were encoded using a JPEG codec.

4. The image decoder of claim 1, wherein the single decoding pass begins at a row start and ends at a row end based on the indication.

5. The image decoder of claim 1, wherein during the single pass, the instructions cause the processor to:
determine a row start and a row end within the image based on the indication;
select a row of pixels to be decoded;
determine whether the row of pixels to be decoded is included in the row start, the row end or rows therebetween;
upon determining the row of pixels to be decoded is included in the row start, the row end or the rows therebetween,
determine whether a row of blocks of the plurality of encoded blocks including the row of pixels to be decoded has been entropy decoded,
upon determining the row of blocks of the plurality of encoded blocks including the row of pixels to be decoded has been entropy decoded, inverse transform the row of pixels to be decoded, and
upon determining the row of blocks of the plurality of encoded blocks including the row of pixels to be decoded has not been entropy decoded, entropy decode the row of blocks of the plurality of encoded blocks including the row of pixels to be decoded and inverse transform the row of pixels to be decoded; and
upon determining the row of pixels to be decoded is not included in the row start, the row end or the rows therebetween, skip processing of the row of pixels to be decoded.

6. The image decoder of claim 1, wherein during the single pass, the instructions cause the processor to:
determine a row start and a row end within the image based on the indication;
select a row of pixels to be decoded;
determine whether the row of pixels to be decoded is the row end; and
upon determining the row of pixels to be decoded is the row end,
determine whether a row of blocks of the plurality of encoded blocks including the row of pixels to be decoded has been entropy decoded,
upon determining the row of blocks of the plurality of encoded blocks including the row of pixels to be decoded has been entropy decoded, inverse transform the row of pixels to be decoded,
upon determining the row of blocks of the plurality of encoded blocks including the row of pixels to be decoded has not been entropy decoded, entropy decode the row of blocks of the plurality of encoded blocks including the row of pixels to be decoded and inverse transform the row of pixels to be decoded, and
stop decoding.

7. The image decoder of claim 1, after completion of the single pass, the instructions cause the processor to:
determine a column start and a column end within the image based on the indication; and
crop a decoded image based on the column start and the column end.

8. The image decoder of claim 1, wherein during the single pass, the instructions cause the processor to:
determine a column start and a column end within the image based on the indication;
decode and inverse transform the plurality of encoded blocks that includes the column start, the column end and the column therebetween; and
skip processing of a remainder of the plurality of encoded blocks.

9. The image decoder of claim 1, wherein during the single pass, the instructions cause the processor to:
determine a row start and a row end within the image based on the indication;
determine a column start and a column end within the image based on the indication;
select a row of pixels to be decoded;
determine whether the row of pixels to be decoded is included in the row start, the row end or the rows therebetween;
upon determining the row of pixels to be decoded is included in the row start, the row end or the rows therebetween,
determine whether a row of blocks of the plurality of encoded blocks including the row of pixels to be decoded has been entropy decoded,
upon determining the row of blocks of the plurality of encoded blocks including the row of pixels to be decoded has been entropy decoded, inverse transform only pixels of the row of pixels to be decoded that are included in the column start, the column end or the columns therebetween, and
upon determining the row of blocks of the plurality of encoded blocks including the row of pixels to be decoded has not been entropy decoded, entropy decode the row of blocks of the plurality of encoded blocks including the row of pixels to be decoded and inverse transform only pixels of the row of pixels to be decoded that are included in the column start, the column end or the columns therebetween; and
upon determining the row of pixels to be decoded is not included in the row start, the row end or the rows therebetween, skip processing of the row of pixels to be decoded.

10. A method comprising:
receiving a bitstream including a plurality of encoded blocks representing an image;
receiving an indication of a cropped portion of the image; and
in a single decoding pass, generating a plurality of entropy decoded blocks by entropy decoding the plurality of encoded blocks that include at least the cropped portion of the image, generating a plurality of inverse transformed blocks by inverse transforming the plurality of entropy decoded blocks, and upsampling and color converting, for display, pixels included in a portion of the plurality of inverse transformed that correspond to the cropped portion of the image; and skipping the single decoding pass for encoded blocks that do not include at least the cropped portion of the image.

11. The method of claim 10, wherein each of the plurality of encoded blocks are independently encoded and one of the plurality of entropy decoded blocks indicates a start position of a next of the plurality of encoded blocks.

12. The method of claim 10, wherein the encoded blocks representing the image were encoded using a JPEG codec.

13. The method of claim 10, further comprising determining a row start and a row end within the image based on the indication, wherein the single decoding pass begins at the row start and ends at the row end.

14. The method of claim 10, wherein during the single pass:

determine a row start and a row end within the image based on the indication, select a row of pixels to be decoded;

determine whether the row of pixels to be decoded is included in the row start, the row end or the rows therebetween;

upon determining the row of pixels to be decoded is included in the row start, the row end or the rows therebetween, determine whether a row of blocks of the plurality of encoded blocks including the row of pixels to be decoded has been entropy decoded, upon determining the row of blocks of the plurality of encoded blocks including the row of pixels to be decoded has been entropy decoded, inverse transform the row of pixels to be decoded, and upon determining the row of blocks of the plurality of encoded blocks including the row of pixels to be decoded has not been entropy decoded, entropy decode the row of blocks of the plurality of encoded blocks including the row of pixels to be decoded and inverse transform the row of pixels to be decoded; and upon determining the row of pixels to be decoded is not included in the row start, the row end or the rows therebetween, skip processing of the row of pixels to be decoded.

15. The method of claim 10, wherein during the single pass:

determine a row start and a row end within the image based on the indication, select a row of pixels to be decoded;

determine whether the row of pixels to be decoded is the row end; and upon determining the row of pixels to be decoded is the row end, determine whether a row of blocks of the plurality of encoded blocks including the row of pixels to be decoded has been entropy decoded, upon determining the row of blocks of the plurality of encoded blocks including the row of pixels to be decoded has been entropy decoded, inverse transform the row of pixels to be decoded, upon determining the row of blocks of the plurality of encoded blocks including the row of pixels to be decoded has not been entropy decoded, entropy decode the row of blocks of the plurality of encoded blocks including the row of pixels to be decoded and inverse transform the row of pixels to be decoded, and stop decoding.

16. The method of claim 10, after completion of the single pass:

determine a column start and a column end within the image based on the indication; and crop a decoded image based on the column start and the column end.

17. The method of claim 10, wherein during the single pass:

determine a column start and a column end within the image based on the indication;

decode and inverse transform the plurality of encoded blocks that includes the column start, the column end and the column therebetween; and skip processing of a remainder of the plurality of encoded blocks.

18. The method of claim 10, wherein during the single pass:

determine a row start and a row end within the image based on the indication, determine a column start and a column end within the image based on the indication;

select a row of pixels to be decoded;

determine whether the row of pixels to be decoded is included in the row start, the row end or the rows therebetween;

upon determining the row of pixels to be decoded is included in the row start, the row end or the rows therebetween, determine whether a row of blocks of the plurality of encoded blocks including the row of pixels to be decoded has been entropy decoded, upon determining the row of blocks of the plurality of encoded blocks including the row of pixels to be decoded has been entropy decoded, inverse transform only pixels of the row of pixels to be decoded that are included in the column start, the column end or the columns therebetween, and upon determining the row of blocks of the plurality of encoded blocks including the row of pixels to be decoded has not been entropy decoded, entropy decode the row of blocks of the plurality of encoded blocks including the row of pixels to be decoded and inverse transform only pixels of the row of pixels to be decoded that are included in the column start, the column end or the columns therebetween; and upon determining the row of pixels to be decoded is not included in the row start, the row end or the rows therebetween, skip processing of the row of pixels to be decoded.

19. A non-transitory computer-readable storage medium having stored thereon computer executable program code which, when executed on a computer system, causes the computer system to perform steps comprising:

receiving a bitstream including a plurality of encoded blocks representing an image;

receiving a boundary indicator representing a cropped portion of the image;

determining a row start and a row end within the image based on the boundary indicator; and in a single decoding pass,
- selecting a row of pixels to be decoded,
- determining whether the row of pixels to be decoded is included in the row start, the row end or the rows therebetween,
- upon determining the row of pixels to be decoded is included in the row start, the row end or the rows therebetween,
  - determining whether a row of blocks of the plurality of encoded blocks including the row of pixels to be decoded has been entropy decoded and has been inverse discrete transformed,
  - upon determining the row of blocks of the plurality of encoded blocks including the row of pixels to be decoded has been entropy decoded and has been inverse transformed, upsample and color convert for display the row of pixels to be decoded, and
  - upon determining the row of blocks of the plurality of encoded blocks including the row of pixels to be decoded has not been entropy decoded and inverse transformed,
    - entropy decode the row of blocks of the plurality of encoded blocks including the row of pixels to be decoded to generate a row of entropy decoded blocks,
    - inverse transform the row of entropy decoded blocks including the row of pixels to be decoded to generate a plurality of inverse transformed blocks, and
    - upsample and color convert, for display, pixels included in a portion of the plurality of inverse transformed blocks that include the row of pixels to be decoded, and
- upon determining the row of pixels to be decoded is not included in the row start, the row end or the rows therebetween, skip entropy decoding, inverse transforming and transforming of the row of pixels to be decoded.

20. The non-transitory computer-readable storage medium of claim 19, the steps further comprising:
- determining a column start and a column end within the image based on the boundary indicator;
- in the single decoding pass and when inverse transforming the row of pixels to be decoded,
  - determining whether a pixel in the row of pixels to be decoded is included in the column start, the column end or the columns therebetween,
  - upon determining the pixel in the row of pixels to be decoded is included in the column start, the column end or the columns therebetween, inverse transform the pixel to be decoded, and
- upon determining the pixel in the row of pixels to be decoded is not included in the column start, the column end or the columns therebetween, skip processing of the pixel to be decoded.

* * * * *